UNITED STATES PATENT OFFICE.

WERNER LANGE, OF BERLIN-FRIEDENAU, GERMANY, ASSIGNOR TO ACTIEN GESELL-
SCHAFT FÜR ANILIN FABRIKATION, OF BERLIN, GERMANY.

ORTHO-OXYMONOAZO DYES.

1,408,363. Specification of Letters Patent. Patented Feb. 28, 1922.

No Drawing. Application filed November 5, 1921. Serial No. 513,174.

*To all whom it may concern:*

Be it known that I, WERNER LANGE, citizen of the German Republic, residing at 10 Feurigstrasse, Berlin-Friedenau, Germany, have invented certain new and useful Improvements in Ortho-Oxymonoazo Dyes, (for which I have made applications in Germany Feb. 6, 1920, and in France June 25, 1920,) of which the following is a specification.

The objects of this invention are new azo dyes derived from picramic acid and a 2-acidylaminophenol substituted by an univalent radicle in the 4-position. The constitution of the new dyes in the free state may be expressed by the general formula:

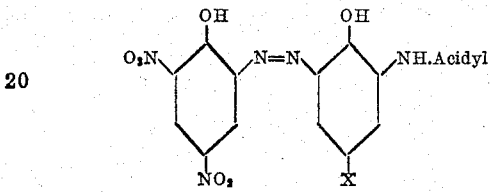

X meaning an univalent radical.

The dyes furnish on wool with aid of chromium mordants olive brown tints of an excellent fastness to washing, to milling, to potting and to light. They are in the shape of pulverized dry sodium salts dark powders, soluble in hot water with a brown coloration, becoming more reddish by the addition of soda lye. From the solution the dyes are precipitated in the form of brown flakes by an acid. Concentrated sulfuric acid dissolves the dyes to a red brown solution. The dyes are destroyed by strong reducing agents yielding 2.4.6-triaminophenol and a 2-acidylamino-6-aminophenol derivative.

In order to illustrate how the dyes may be manufactured the following example is given, the parts being by weight:

19.9 parts of picramic acid are diazotized as usual and coupled with a solution of 16.5 parts of 4-methyl-2-acetylaminophenol, alkaline by sodium carbonate. When the combination is complete the dye is salted out, drained and dried. Its constitution in the free state may be expressed by the formula:

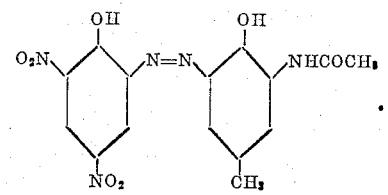

For the process indicated other 2-acidylaminophenol derivatives substituted in the 4-position may be used, for instance 4-methyl-2-formylaminophenol.

Having now described my invention and the manner in which it may be performed what I claim is,—

1. The herein-described monoazo dyes derived from diazotized picramic acid and a 2-acidylaminophenol substituted by an univalent radical in the 4-position, corresponding in the free state to the general formula:

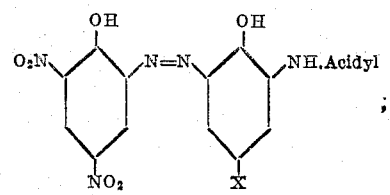

where X means an univalent radicle, being in the shape of pulverized dry sodium salts dark powders soluble in hot water with a brown color becoming more reddish by addition of soda lye, the dye being precipitated as brown flakes by an acid; soluble in concentrated sulfuric acid with a red brown color; being destroyed by strong reducing agents yielding 2.4.6-triaminophenol and a 2-acidylamino-6-aminophenol derivative.

2. The herein-described monoazo dyes derived from diazotized picramic acid and 2-acidylamino-4-methylphenol corresponding in the free state to the general formula:

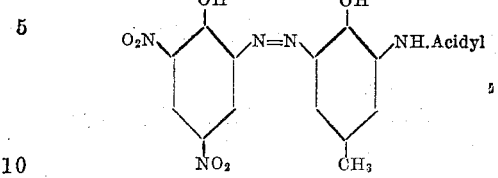

being in the shape of pulverized dry sodium salts dark powders soluble in hot water with a brown color becoming more reddish by addition of soda lye, the dye being precipitated as brown flakes by an acid; soluble in concentrated sulfuric acid with a red brown color; being destroyed by strong reducing agents yielding 2.4.6-triaminophenol and a 2-acidylamino-6-amino-4-methylphenol.

3. The herein described monoazo dye derived from diazotized picramic acid and 2-acetylamino-4-methylphenol, in the free state corresponding to the formula:

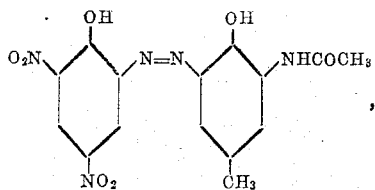

being in the shape of the pulverized dry sodium salt a dark powder soluble in hot water with a brown color becoming more reddish by addition of soda lye, the dye being precipitated as brown flakes by an acid; soluble in concentrated sulfuric acid with a red brown color; being destroyed by strong reducing agents yielding 2.4.6-triaminophenol and 2-acetylamino-6-amino-4-methylphenol.

In testimony whereof I affix my signature in presence of two witnesses.

WERNER LANGE.

Witnesses:
Dr. LUDWIG NEUMANN,
Dr. HEINRICH CULENDORF.